United States Patent [19]

Jasensky

[11] 4,205,706
[45] Jun. 3, 1980

[54] PROTECTIVE CAP FOR AN EXHAUST PIPE

[75] Inventor: Richard J. Jasensky, Stoughton, Wis.

[73] Assignee: Nelson Industries, Inc., Stoughton, Wis.

[21] Appl. No.: 923,996

[22] Filed: Jul. 12, 1978

[51] Int. Cl.² ............... F23L 17/02; F16L 55/10
[52] U.S. Cl. .................... 138/89; 98/59; 60/324
[58] Field of Search ............ 138/89, 96 R, 96 T; 220/201, 334, 337, 360; 98/86, 122, 59; 236/93 R, 1 G, 101 D, 101 R, 41; 60/324

[56] References Cited

U.S. PATENT DOCUMENTS

| 2,008,835 | 7/1935 | Rawcliffe | 236/93 X |
|---|---|---|---|
| 2,022,460 | 11/1935 | Dutcher | 236/93 X |
| 2,241,108 | 5/1941 | Akers | 236/49 |
| 2,250,045 | 7/1941 | Focke et al. | 220/201 |
| 2,258,506 | 10/1941 | Fisher | 98/86 |
| 2,278,422 | 4/1942 | Brown | 236/93 X |
| 2,285,309 | 6/1942 | Reid | 236/93 |
| 2,293,913 | 8/1942 | Munson | 236/93 X |
| 2,322,980 | 6/1943 | Smith | 220/201 X |
| 2,565,361 | 8/1951 | Elm | 220/201 |
| 2,698,022 | 12/1954 | Fahhoe | 236/93 X |
| 2,749,832 | 6/1956 | Harmon | 98/59 |
| 3,251,336 | 5/1966 | O'Brien | 98/59 X |
| 3,446,010 | 5/1969 | Hopkins | 60/324 X |
| 3,964,376 | 6/1976 | Janke | 98/59 |

FOREIGN PATENT DOCUMENTS

| 135331 | 7/1947 | Australia | 98/59 |
|---|---|---|---|
| 1103801 | 11/1955 | France . | |
| 648119 | 12/1950 | United Kingdom | 98/59 |

*Primary Examiner*—Richard E. Aegerter
*Assistant Examiner*—James E. Bryant, III
*Attorney, Agent, or Firm*—Andrus, Sceales, Starke & Sawall

[57] ABSTRACT

A temperature responsive protective cap for a gas exhaust pipe. The cap includes a base portion which is connected to the upper end of the exhaust pipe of an internal combustion engine, and a lid or cover is hinged to the base and can be pivoted between closed and open positions. A bi-metallic element is interconnected between the base and the lid, and on operation of the engine the increase in temperature in the exhaust pipe will actuate the bi-metallic element to pivot the lid to the open position.

3 Claims, 4 Drawing Figures

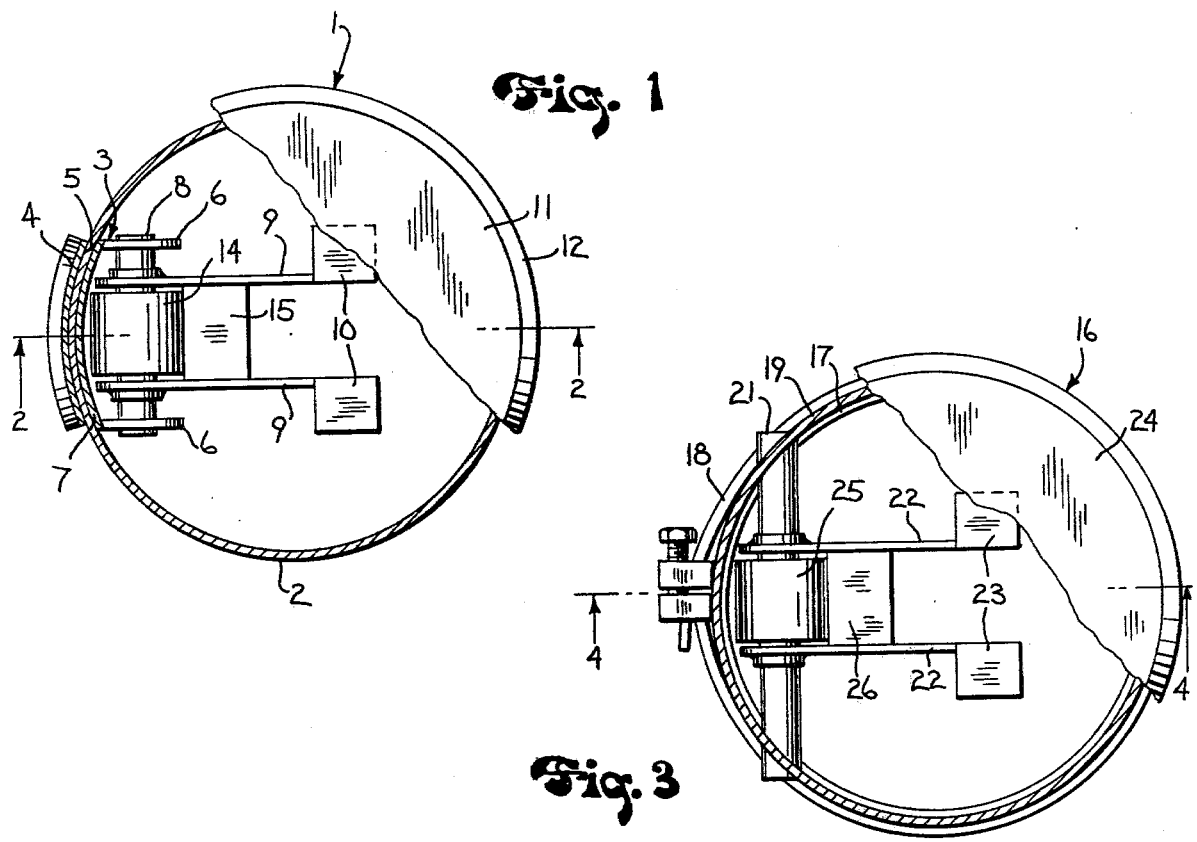
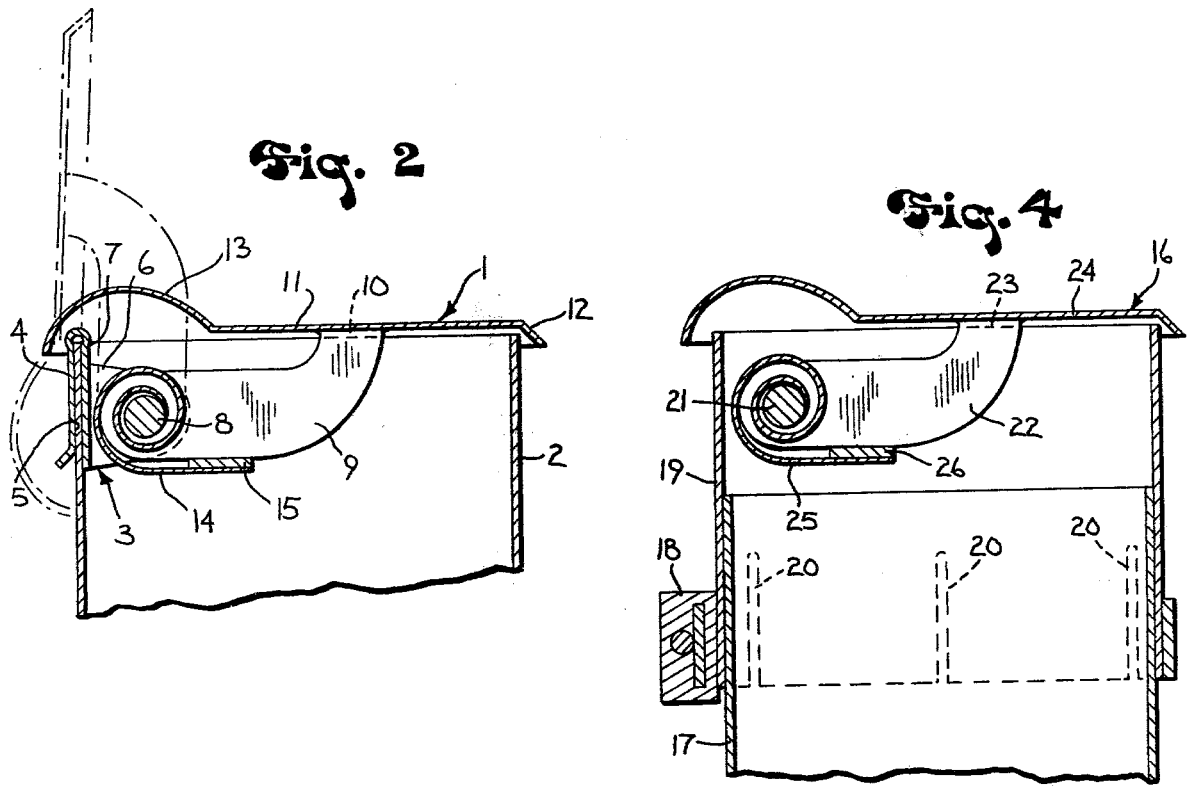

4,205,706

PROTECTIVE CAP FOR AN EXHAUST PIPE

BACKGROUND OF THE INVENTION

Construction or agricultural equipment is frequently stored out of doors, and to prevent rain, snow and other materials from entering the vertical exhaust pipe during periods of non-operation, protective caps are frequently used in conjunction with the exhaust pipe. The typical protective cap is hinged to the upper end of the exhaust pipe and is counterweighted to the closed position. On operation of the engine, the increase of pressure in the exhaust pipe will move the cap to the open position.

The conventional pressure responsive cap is subject to vibration due to surges of pressure within the exhaust pipe, and the vibration not only generates substantial noise, but produces fatigue on the components of the cap, with the result that the cap has a limited life of service.

SUMMARY OF THE INVENTION

The invention relates to a temperature responsive protective cap for an exhaust pipe, and has specific application to a vertical exhaust pipe used in conjunction with off-road or agricultural equipment. In accordance with the invention, the cap includes a base portion which is attached to the upper end of the exhaust pipe, and a cover or lid is hinged to the base portion and is movable between a closed and open position. Connecting the base portion and the lid is a bi-metallic element, and on operation of the engine, the increase in temperature in the exhaust pipe will actuate the bi-metallic element to pivot the lid from the closed to the open position.

When operation of the engine is stopped, the temperature in the exhaust pipe will decrease and the bimetallic element will move the lid back to the closed position.

In one form of the invention the base portion is provided with a clip member which defines a vertical slot that receives the upper edge of the exhaust pipe. By engaging the edge of the pipe with the slot, the cap will be firmly secured to the upper end of the exhaust pipe.

In a modified form of the invention the base portion of the cap is provided with a cylindrical skirt or sleeve which is clamped to the outer surface of the exhaust pipe by a conventional clamping ring.

The protective cap of the invention is not affected by gas pressure surges within the exhaust pipe, so that the cap will remain in the open position after warm up of the engine. This prevents vibration of the cap and eliminates chatter as well as decreasing fatigue on the components of the cap.

When operation of the engine is terminated and the temperature within the exhaust pipe decreases, the cap will slowly move to the closed position. In the event of rain or snow during this interim, the rain or snow will cool the bi-metallic element to cause a more rapid movement of the lid to the closed position.

Other objects and advantages will appear in the course of the following description.

DESCRIPTION OF THE DRAWINGS

The drawings illustrate the best mode presently contemplated of carrying out the invention.

In the drawings:

FIG. 1 is a top plan view of the protective cap of the invention as attached to a vertical exhaust pipe and with parts broken away in section;

FIG. 2 is a section taken along line 2—2 of FIG. 1;

FIG. 3 is a view similar to FIG. 1 showing a modified form of the cap; and

FIG. 4 is a section taken along line 4—4 of FIG. 3.

DESCRIPTION OF THE PREFERRED EMBODIMENT

FIGS. 1 and 2 illustrate a protective cap 1 to be connected to the upper end of a vertical exhaust pipe 2 associated with an internal combustion engine of off-road or agricultural equipment. The cap 1 has a base portion 3 which is located within the upper end of the exhaust pipe, and the base includes a generally U-shape clip 4 defining a vertical slot 5 which receives the upper edge of the exhaust pipe 2. By pushing the clip downwardly over the upper edge of the pipe 2, the cap will be securely connected to the exhaust pipe.

In addition to the clip 4, the base also includes a pair of generally parallel, spaced arms 6 which extend inwardly from the inner section 7 of clip 4. Mounted within aligned openings in the arms 6 is a shaft 8, and a pair of brackets 9 are journalled on the shaft. Brackets 9 have a generally L-shaped configuration, and the outer ends of the brackets are provided with feet 10 that are welded or otherwise connected to undersurfaces of the lid or cover 11.

As shown in FIG. 2, the peripheral edge of the cover 11 is provided with a downwardly extending flange or skirt 12 which is located outwardly of the upper end of the exhaust pipe 2. Cover 11 is also provided with a dome portion 13 which provides clearance when the cover is pivoted between the closed and open positions.

To pivot brackets 9 and thereby move the cover 11 between the closed and open positions, a bi-metallic element 14 is connected between the shaft 8 and the brackets 9. Element 14 is in generally coiled form and the inner end of the coiled element 14 is secured to the shaft 8, as shown in FIG. 2, while the opposite end of the element is secured to a bar 15 which connects the lower edges of the bracket 9.

When the engine is operated, the exhaust gases in the exhaust pipe will cause the temperature to increase, thereby actuating the bi-metallic element and rotating the shaft 8, to pivot the brackets 9 and move the cover to the open position. When operation of the engine is terminated, the decrease in temperature will automatically move the cover 11 to the closed position through operation of the bi-metallic element.

FIGS. 3 and 4 show a modified form of the invention in which a cap 16 is secured to the upper end of an exhaust pipe 17 by a clamping ring 18. As shown in FIG. 4, the cap 16 includes a sleeve 19 which is positioned around the exhaust pipe 17 and is provided with a series of spaced longitudinal slots 20. The slots 20 permit the lower end of sleeve 19 to be deformed inwardly under the force of the clamping ring 18 to thereby enable the sleeve to firmly engage the exhaust pipe.

Mounted within aligned holes in sleeve 19 is a horizontal shaft 21 and a pair of brackets 22, similar to brackets 9 of the first embodiment, are journalled on the shaft. As in the first embodiment, brackets 22 are provided with feet 23 that are secured to the underside of cover 24, which is similar in construction to cover 11.

To pivot brackets 22 about the shaft 21, a bi-metallic element 25, similar to element 14, is connected between the shaft 21 and a bar 26 which connects the lower edges of the brackets 22.

As previously described, an increase in temperature within the exhaust pipe 2, caused by operation of the engine, will operate the bi-metallic element 25 to pivot the brackets 22 and open the cover 24. When operation of the engine stops, the decrease in temperature will cause the element 25 to pivot the brackets 22 in the reverse direction and move the cover to the closed position.

While the above description has illustrated the protective cap of the invention as associated with the exhaust pipe of an internal combustion engine, it is contemplated that the cap can be used with other types of pipes or tubes adapted to conduct or vent heated gases.

Various modes of carrying out the invention are contemplated as being within the scope of the following claims particularly pointing out and distinctly claiming the subject matter which is regarded as the invention.

I claim:

1. A combination gas exhaust pipe and temperature responsive protective cap construction, comprising an exhaust pipe to conduct an exhaust gas, and a cap connected to an end of said pipe, said cap including a base portion adapted to be connected to the pipe and including a shaft, a temperature responsive bi-metallic element disposed in coiled configuration around the shaft and located in the path of the gas flowing through the pipe, the inner end of said element being secured to said shaft, a cover mounted for pivoting movement with respect to the base portion from a closed position, where the cover encloses said end of the pipe, to an open position, and a support member pivotally mounted on the shaft and rigidly secured to the underside of said cover to support said cover and providing the sole support for the cover, the opposite end of the bi-metallic element being connected to said support member, an increase in gas temperature in the pipe actuating said element to thereby pivot the cover about the axis of the shaft from the closed to the open position.

2. The cap of claim 1, wherein the pipe is an exhaust pipe for an internal combustion engine and is disposed vertically.

3. The cap of claim 1, and including clip means associated with the base portion and defining a vertically extending slot, the end of the exhaust pipe received in the slot to clamp the cap to the exhaust pipe.

* * * * *